United States Patent [19]

Morimoto

[11] Patent Number: 5,249,760
[45] Date of Patent: Oct. 5, 1993

[54] FISHING REEL WITH FEED SHAFT AND TRANSMISSION MEMBER

[75] Inventor: Shinichi Morimoto, Sakai, Japan

[73] Assignee: Shimano, Inc., Osaka, Japan

[21] Appl. No.: 983,266

[22] Filed: Nov. 30, 1992

Related U.S. Application Data

[63] Continuation of Ser. No. 652,675, Feb. 8, 1991, abandoned.

[30] Foreign Application Priority Data

Feb. 23, 1990 [JP] Japan .................... 2-18032[U]

[51] Int. Cl.$^5$ ........................................... A01K 89/015
[52] U.S. Cl. .................................... 242/279; 403/348
[58] Field of Search ............... 242/279, 278, 280, 281; 403/348, 349

[56] References Cited

U.S. PATENT DOCUMENTS

| | | | |
|---|---|---|---|
| 1,873,326 | 8/1932 | Ratigan | 403/348 |
| 2,379,984 | 7/1945 | Nereaux | 403/348 |
| 2,697,581 | 12/1954 | Ray | 403/348 |
| 3,032,281 | 5/1962 | Wexell | 403/348 X |
| 3,612,425 | 10/1971 | Skakespeare | 242/279 X |
| 3,858,990 | 1/1975 | Busselmeier | 403/349 X |
| 4,645,392 | 2/1987 | Takaguchi | 403/349 X |

FOREIGN PATENT DOCUMENTS 2141055 3/1973 Fed. Rep. of Germany ...... 403/348

Primary Examiner—Katherine Matecki
Attorney, Agent, or Firm—Dickstein, Shapiro & Morin

[57] ABSTRACT

A fishing reel having a reel body, a feed shaft attached to the reel body and forming in its periphery a spiral groove for feeding a fishing line from the reel and a transmission member attached to an end of the feed shaft for rotation therewith. The feed shaft is disposed continously with an attaching shaft axially extending through the transmission member. The attaching shaft integrally defines a non-round retaining portion at an end of the attaching shaft, with the retaining portion projecting radially and outwardly relative to the attaching shaft. The transmission member forms an anti-rotation face peripherally engageable with the retaining portion so as to prevent axial rotation of the transmission member relative to the attaching shaft, a retaining face axially engageable with the retaining portion so as to prevent withdrawal of the transmission member from the attaching shaft, and a through hole for inserting the attaching shaft therethrough. The through hole has a non-round shape which shape allows insertion of the retaining portion only when the transmission member is out of an axial setting position thereof relative to the attaching shaft.

4 Claims, 3 Drawing Sheets

FISHING REEL WITH FEED SHAFT AND TRANSMISSION MEMBER

This application is a continuation of application Ser. No. 07/652,675 filed Feb. 8, 1991 now abandoned.

BACKGROUND OF THE INVENTION

1. Field of the Invention

The present invention relates to a fishing reel having a reel body, a feed shaft attached to the reel body and forming in its periphery a spiral groove for feeding a fishing line from the reel and a transmission member attached to an end of the feed shaft for rotation therewith.

2. Description of the Related Art

According to a typical fishing reel of the above-described type, an attaching shaft axially extending through the transmission member is provided continuously with the feed shaft and the transmission member is unrotably and unwithdrawably secured to the attaching shaft by means of calking.

According to another conventional type, the transmission member defines a non-round hole through which the attaching shaft extends so that the non-round shape of the hole prevents relative rotation between the transmission member and the attaching shaft, and a letter 'E'-shaped washer is used for unwithdrawable attachment between the transmission member and the attaching shaft.

With the former-mentioned convention, the attaching operation for attaching the transmission shaft to the feed shaft requires two steps: one step for inserting the attaching shaft into the transmission member and the other step for calking the connection therebetween, whereby the production efficiency suffers. Further, the calking attachment requires that the transmission member be formed of a metallic material rather than an inexpensive material such as a synthetic resin.

With the latter-mentioned convention, the construction requires the E-shaped washer only for the above-described purpose, whereby the construction suffers in the economy of the number of elements used therein as well as resultant deterioration in the production efficiency.

Taking the above state of the art into consideration, the primary object of the present invention is to provide an improved fishing reel which can be manufactured efficiently and economically.

SUMMARY OF THE INVENTION

For accomplishing the above-described object, the fishing reel according to the present invention, comprises: a reel body; a feed shaft attached to the reel body and forming in its periphery a spiral groove for feeding a fishing line from the reel; and a transmission member attached to an end of the feed shaft for rotation therewith; wherein the feed shaft is disposed continuously with an attaching shaft axially extending through the transmission member; the attaching shaft integrally defines a non-round retaining portion at an end of said attaching shaft, the retaining portion projecting radially and outwardly relative to the attaching shaft. And, the transmission member forms an anti-rotation face peripherally engageable with retaining portion so as to prevent axial rotation of the transmission member relative to the attaching shaft, a retaining face axially engageable with the retaining portion so as to prevent withdrawal of the transmission member from the attaching shaft, and a through hole for inserting said attaching shaft therethrough, the through hole having a non-round shape which shape allows insertion of the retaining portion only when the transmission member is out of an axial setting position thereof relative to the attaching shaft.

Functions and effects of the above-described construction will be described next.

According to the invention's construction, first, while maintaining the posture of the transmission member for allowing insertion of its retaining portion through the attaching shaft, the transmission member and the feed shaft are so operated relative to each other that the attaching shaft is inserted into the through hole. Then, the two elements are further operated until the retaining face comes into abutment against the retaining portion. This completes the assembly.

In this way, the invention's construction can eliminate the calking step and the E-shaped washer used by the conventions, so that the construction can improve the production efficiency and also allows use of an inexpensive and readily workable material such as a synthetic resin for forming the transmission member.

Further and other objects, features and effects of the invention will become more apparent from the following more detailed description of the embodiments of the invention with reference to the accompanying drawings.

BRIEF DESCRIPTION OF THE DRAWINGS

FIGS. 1 through 3 show one preferred embodiment of a fishing reel according to the invention, in which;

FIG. 1 is a section view showing major portions of a double-bearing type fishing reel as one example of the fishing reel, FIG. 2 is a front view of the reel, and FIG. 3 is an exploded perspective view of the reel, FIGS. 4 through 6 show another fishing reel according to a further embodiment of the invention, in which;

FIG. 4 is an exploded perspective view showing major portions of the reel,

FIG. 5 is a section view of the reel, and

FIG. 6 is an exploded perspective view of the reel.

DESCRIPTION OF THE PREFERRED EMBODIMENTS

Preferred embodiments of a fishing reel according to the present invention will now be described in particular with reference to the accompanying drawings.

Figure 2:
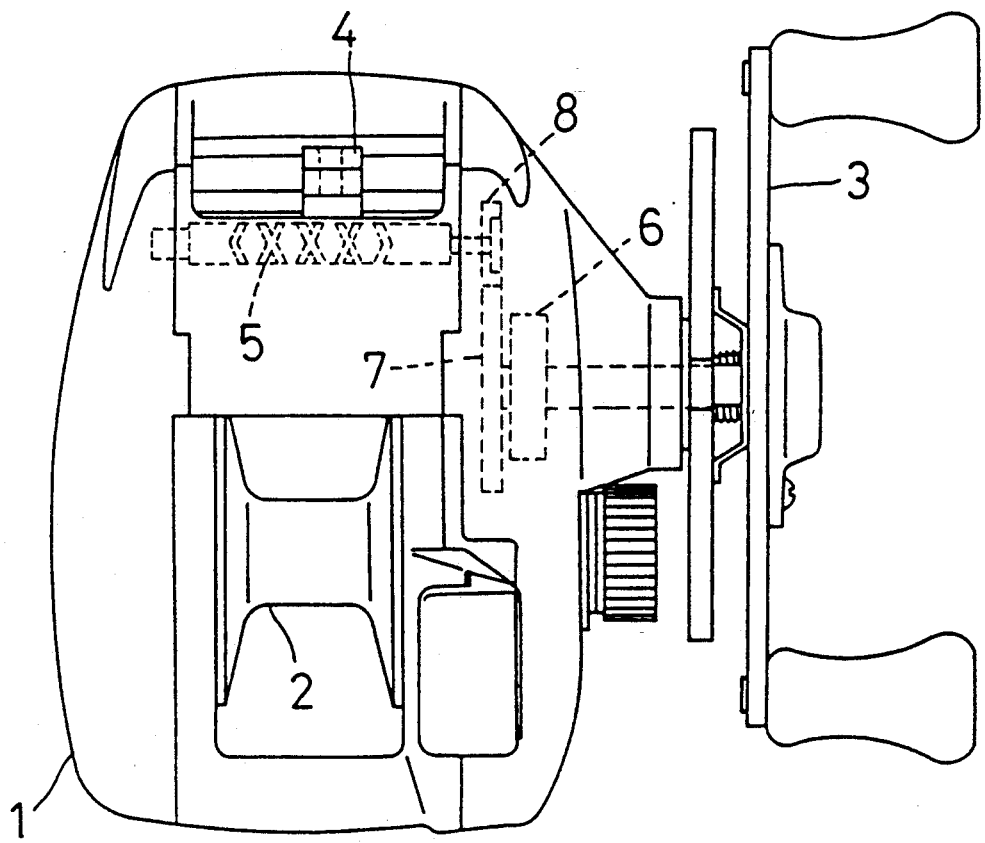

FIG. 2 shows a double-bearing type fishing reel as one example of the invention's fishing reel. As shown, this fishing reel includes a reel body 1, a spool 2, a handle 3, a level-wind mechanism 4 for guiding a fishing line about the spool 2 and a feed shaft 5 for axially reciprocating the level-wind mechanism 4 in association with rotation of the spool 2.

Figure 1:
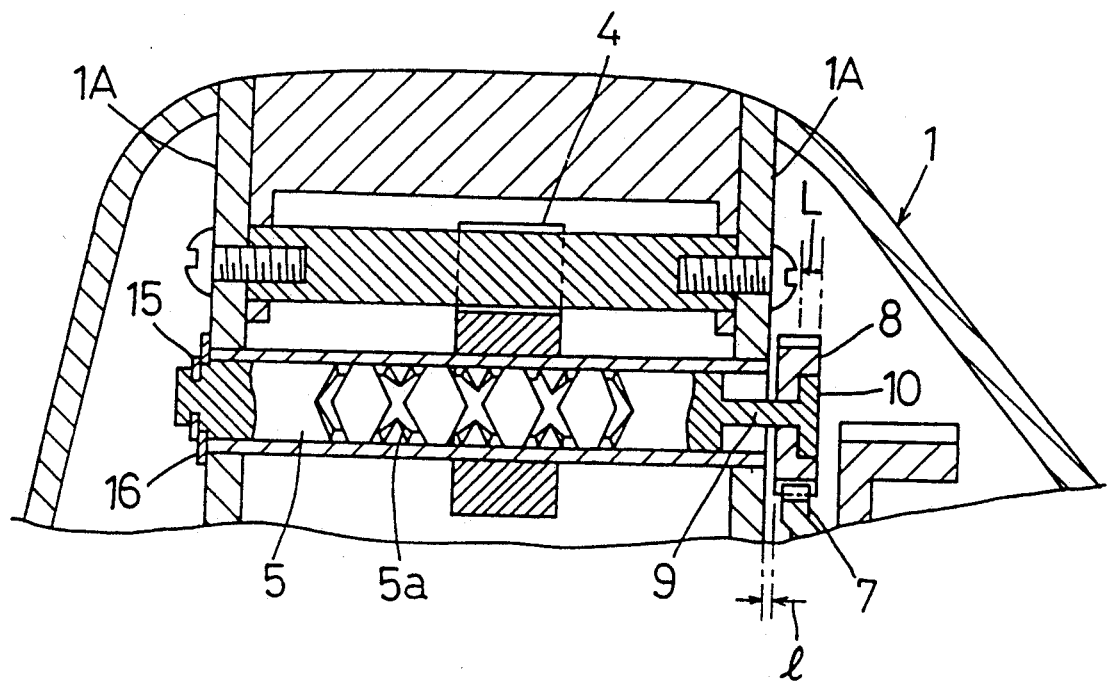

As shown in FIG. 1, the feed shaft 5 extends and is rotatably supported between a pair of side plates 1A of the reel body 1 opposed to each other with an axial interdistance therebetween. This feed shaft 5 defines, in its peripheral face, a spiral groove 5a as an example of a spiral feeding groove for engaging an unillustrated projection of the level-wind mechanism 4. Accordingly, as the feed shaft 5 is rotated, the level-wind mechanism 4 is moved back and forth along the spiral groove 5a.

Further, at one end of the feed shaft 5, there is fixedly fitted an input gear 8 (an example of a transmission member) meshing a drive gear 7 operable by the handle 3 via a drag mechanism 6. This attachment construction will be detailed next.

Figure 3:
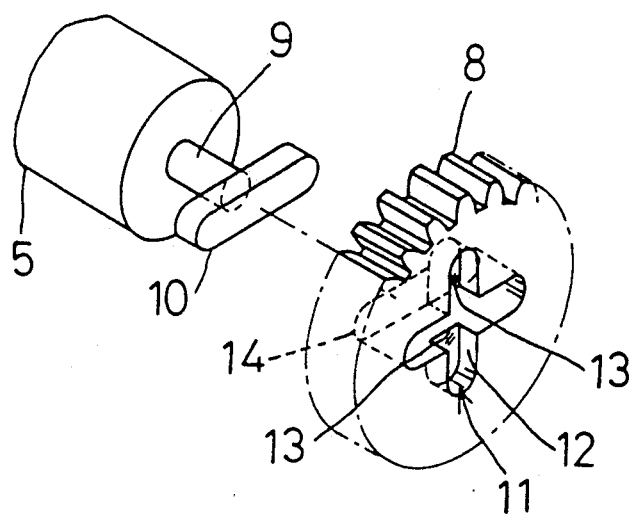

As shown in FIGS. 1 and 3, continuously with the feed shaft 5, there is provided an attaching shaft 9 axially extending through the gear 8. Further, at a leading end of this attaching shaft 9, there is continuously provided a retaining portion 10 having a non-round shape (more particularly, axially extending like a straight line) and extending radially and outwardly relative to the shaft 9. On the other hand, at an end face of the gear 8, there is defined a line-like concave portion 11 corresponding to and engageable with the retaining portion 10. More particularly, this concave portion 11 includes an anti-rotation face 12 peripherally engageable with the retaining portion 10 so as to prevent axial rotation of the gear 8 relative to the attaching shaft 9 and a retaining face 13 axially engageable with the retaining portion 10 so as to prevent withdrawal of the gear 8 from the attaching shaft 9. Further, the gear 8 defines a through hole 14 for inserting the attaching shaft 9 therethrough, and this through hole 14 has such a line-like shape that allows insertion of the retaining portion 10 only when the gear 8 is out of an axial setting position thereof relative to the attaching shaft 9, more particularly, only when the gear 8 is located at a 90-degree displaced position relative to the axial setting position.

With the above-detailed construction, the gear 8 is first positioned at the 90-degree displaced position so as to insert the attaching shaft 9 into the through hole 14. Then, gear 8 is rotated by 90 degrees relative to the attaching shaft 9 thus setting the gear 5 at the axial setting position and the retaining portion 10 is guided into the concave portion 11. With these, the gear 8 is unrotatably and unwithdrawably fitted on the feed shaft 5. Incidentally, movement of the gear 8 in the direction opposite to the withdrawing direction is restricted by abutment between this gear 8 and the one side plate 1A.

In attaching the feed shaft 5, the abutment between the gear 8 against the one side plate 1A restricts movement of the feed shaft 5 towards the other side plate 1A; whereas, abutment between the other side plate 1A and a washer 16 unwithdrawably fitted at the other end of the feed shaft 5 via a snap ring 15 restricts movement of the feed shaft 5 toward the one side plate 1A. Accordingly, it is important that a gap width l between the gear 8 and the one side plate 1A be smaller than an axial width L of the anti-rotation face 12 so as to maintain the engagement between the anti-rotation face 12 and the retaining portion 10.

Some other embodiments of the invention will be described next.

Figure 4:
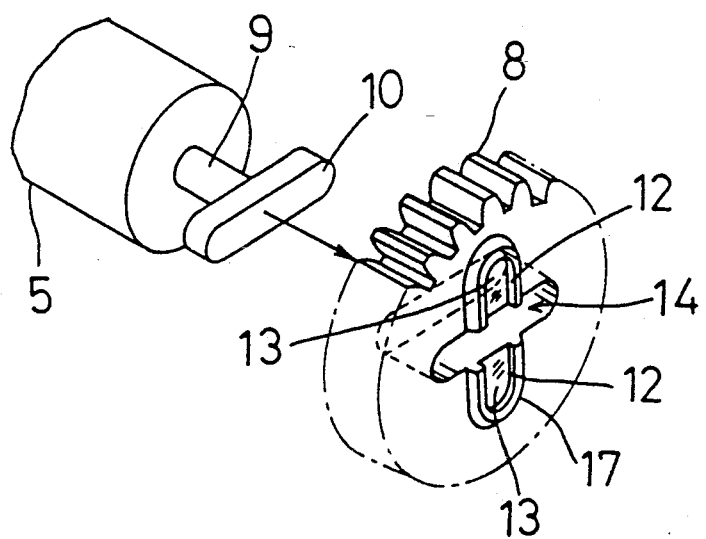

(1) In the foregoing embodiment, the anti-rotation face 12 comprises the concave portion 11. Instead, as shown in FIG. 4, the anti-rotation face may comprise a convex portion 17 formed on one end face of the transmission member 8 on the opposite side to the feed shaft 5.

(2) It is conceivable to elastically fit the retaining face 10 into the concave portion 11.

(3) The shape of the retaining face 10 is not limited to that disclosed in the foregoing embodiment, but may be modified depending on the convenience.

(4) The construction of the present invention is applicable to any other type of fishing reel than the double-bearing type fishing reel disclosed in the foregoing embodiment.

Figure 5:
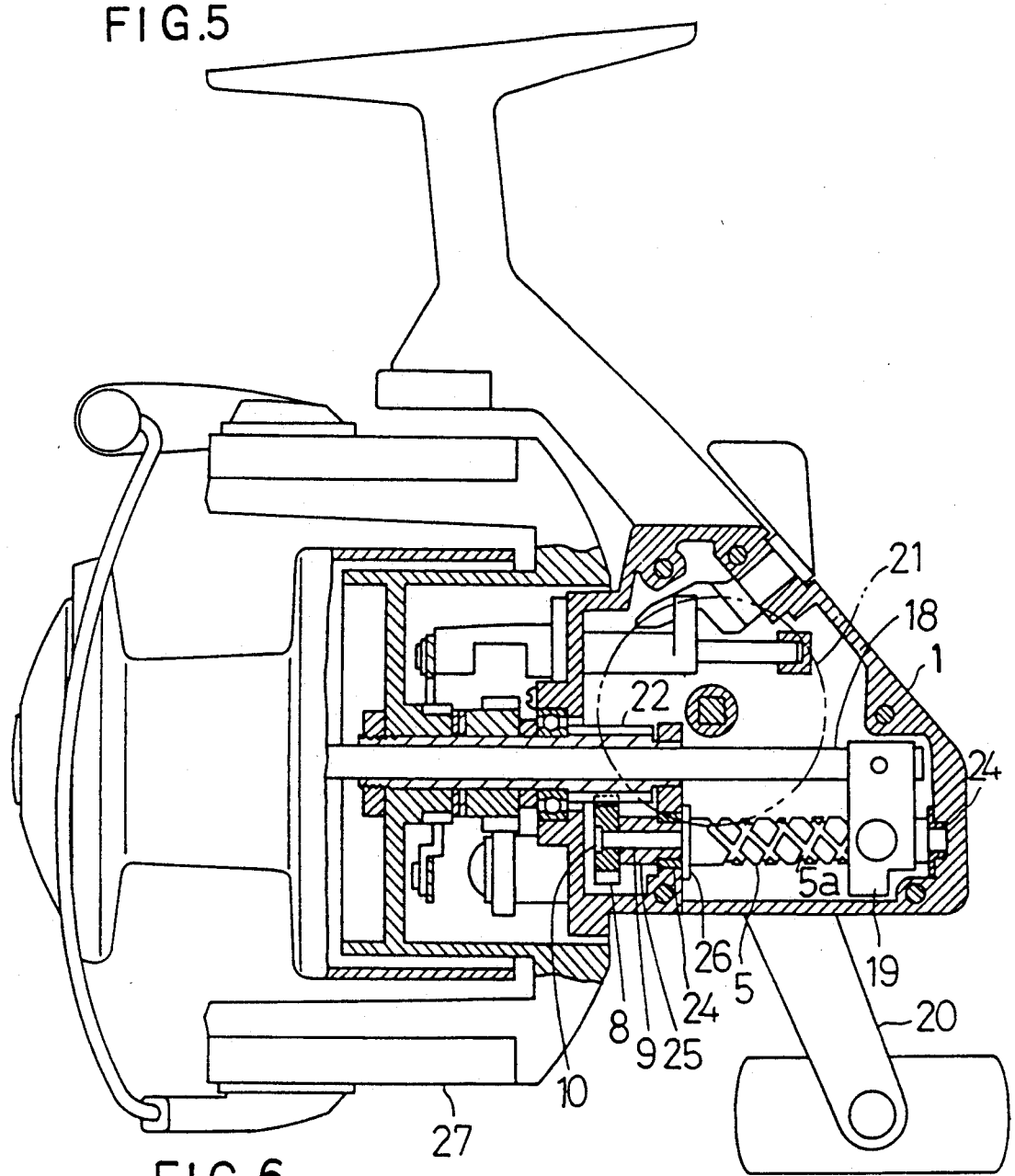

For instance, as shown in FIG. 5, the invention may be embodied in a spinning reel. In this reel, the feed shaft 5 defines in its peripheral face a feeding spiral groove 5a for engaging an unillustrated projection on an element 19 attached to a spool shaft 18 of a spool 17. As a result, with rotation of this feed shaft 5, the spool shaft 18 is moved back and forth as being guided by the feeding spiral groove 5a. That is to say, the invention may be embodied in a construction for attaching an input gear 8 (an example of the transmission member) meshing a pinion gear 22 operable via a master gear 21 by a handle 20 to an end of the feed shaft 5.

Figure 6:
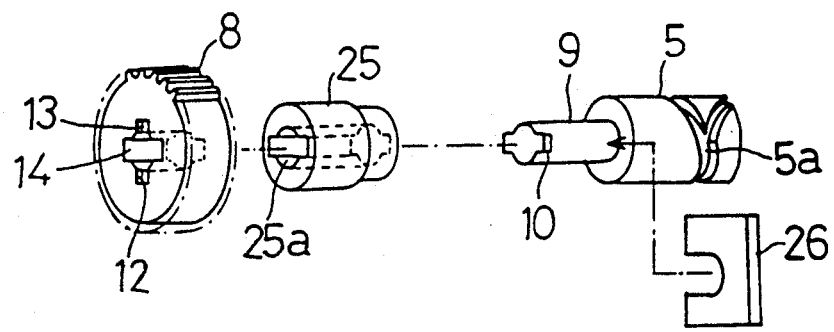

More specifically, like the foregoing embodiment, at one end of the feed shaft 5, there is continuously provided an attaching shaft 9 having a retaining portion 10. Whereas, the gear 8 has an anti-rotation face 12 and a retaining face 13. Besides, the feed shaft 5 defines the through hole 14 for the insertion of the attaching shaft, like the foregoing embodiment. The feed shaft 5 is pivotably supported to a pair of bosses 24 of the reel body 1, with a bush 25 being interposed between the boss 24 and one end of the feed shaft 5. The bush 25 acts as a distance-maintaining means for preventing an approaching movement of the gear 8 to the boss 24 beyond a predetermined distance, as the bush 25 comes into abutment against opposing side faces of the boss 24 and the gear 8. The bush 25 defines a through hole 25a for the insertion of the attaching shaft and the hole 25a has such a shape as to allow insertion of the retaining portion 10, as shown in FIG. 6. A reference numeral 26 denotes a stopper plate for restricting movement of the feed shaft 5, at one end thereof, relative to the boss 24. This stopper plate 26, as shown also in FIG. 6, has a letter 'U'-shaped opening engageable with the attaching shaft 9, so that the attaching shaft 9 is attached through this opening from the immediate forward side to the back side of FIG. 5. And, this stopper plate 26 is retained against withdrawal by the side wall of the reel body 1. Further, when one end face of the feed shaft 5 is brought into abutment against the side face of the boss 24 with removing the stopper plate 26, the retaining portion 10 is axially detached from the anti-rotation face 12 of the gear 8 thus allowing free rotation of the gear 8 relative to the attaching shaft 9. A reference numeral 27 denotes a rotary frame rotatable with the pinion gear 22.

The shape of the stopper plate 26 is not limited to that shown in FIG. 6. For instance, the stopper plate 26 may be shaped like an E-shaped stopper ring.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fishing reel, comprising:
  a reel body (1) having an interior side plate (1A);
  a feed shaft (5) for axially reciprocating a level wind mechanism (4), said feed shaft being rotatably supported by said side plate, said feed shaft having a diameter; and
  torque transmitting structure for transmitting torque to said feed shaft, said torque transmitting structure comprising:

a torque transmitting gear (8) which is coaxial with said feed shaft, said torque transmitting gear having a first face that faces toward said side plate and a second face that faces away from said side plate, said fishing reel being arranged such that the distance between said first face and said side plate is no greater than a gap width (l);

a joint shaft (9) extending from an end surface of said feed shaft facing said gear, said joint shaft being coaxial with said feed shaft, said joint shaft having a diameter, the diameter of said joint shaft being less than the diameter of said feed shaft;

an engaging head (10) projecting from an end of said joint shaft, said engaging head being in the shape of a bar with a substantially square cross-section, said engaging head having a thin rectangular engaging face which is perpendicular to the axis of said feed shaft and which faces said end surface of said feed shaft, said engaging face having two elongated edges, and said engaging head having two thin rectangular torque transmitting faces extending from said elongated edges of said engaging face, said torque transmitting faces being parallel to each other;

a radially extending slot (14) for allowing said engaging head to move through said gear, said slot being located at the center of said gear; and a retaining means (11) which is matable with said engaging head, said retaining means being angularly displaced with respect to said slot, said retaining means being located on said second face of said torque transmitting gear, said retaining means having a bottom engaging wall (13) for engaging said engaging face of said engaging head, said retaining means also having side surfaces (12) for contacting and transmitting torque to said torque transmitting faces, said side surfaces being perpendicular to said bottom engaging wall, said side surfaces (12) having an axial width (L) in a direction parallel to the axis of said feed shaft, said axial width (L) being greater than said gap width (l).

2. A structure for transmitting torque to a feed shaft (5) of a fishing reel, comprising:

a torque transmitting gear (8) which is coaxial with said feed shaft;

a joint shaft (9) extending from an end surface of said feed shaft facing said gear, said joint shaft being coaxial with said feed shaft;

an engaging head (10) projecting from an end of said joint shaft, said engaging head being in the shape of a bar with a substantially square cross-section, said engaging head having a thin rectangular engaging face which is perpendicular to the axis of said feed shaft and which faces said end surface of said feed shaft, said engaging face having two elongated edges, and said engaging head having two thin rectangular torque transmitting faces extending from said elongated edges of said engaging face, said torque transmitting faces being parallel to each other;

a radially extending slot (14) for allowing said engaging head to move through said gear, said slot being located at the center of said gear; and a retaining means (11) which is matable with said engaging head, said retaining means being angularly displaced with respect to said slot, said retaining means being located on a face of said gear that faces away from said feed shaft, said retaining means having a bottom engaging wall (13) for engaging said engaging face of said engaging head, said retaining means also having side surfaces (12) for contacting and transmitting torque to said torque transmitting faces, said side surfaces being perpendicular to said bottom engaging wall; and wherein said side surfaces are formed by projections (17) which project axially from said face of said gear.

3. A structure for transmitting torque to a feed shaft (5) of a fishing reel, comprising:

a torque transmitting gear (8) which is coaxial with said feed shaft;

a joint shaft (9) extending from an end surface of said feed shaft facing said gear, said joint shaft being coaxial with said feed shaft;

an engaging head (10) projecting from an end of said joint shaft, said engaging head being in the shape of a bar with a substantially square cross-section, said engaging head having a thin rectangular engaging face which is perpendicular to the axis of said feed shaft and which faces said end surface of said feed shaft, said engaging face having two elongated edges, and said engaging head having two thin rectangular torque transmitting faces extending from said elongated edges of said engaging face, said torque transmitting faces being parallel to each other;

a radially extending slot (14) for allowing said engaging head to move through said gear, said slot being located at the center of said gear; and a retaining means (11) which is matable with said engaging head, said retaining means being angularly displaced with respect to said slot, said retaining means being located on a face of said gear that faces away from said feed shaft, said retaining means having a bottom engaging wall (13) for engaging said engaging face of said engaging head, said retaining means also having side surfaces (12) for contacting and transmitting torque to said torque transmitting faces, said side surfaces being perpendicular to said bottom engaging wall; and wherein said joint shaft is rotatably supported on a boss (24) fixed to said reel body, and wherein a bush (25) is maintained between said boss and said gear, whereby said gear is secured to said feed shaft.

4. A structure for transmitting torque to a feed shaft of a fishing reel as set forth in claim 3, wherein said bush has a through hole (25a) for receiving said engaging head.

* * * * *